(12) United States Patent
Schaeffer et al.

(10) Patent No.: US 12,343,787 B2
(45) Date of Patent: Jul. 1, 2025

(54) METHOD FOR INTEGRATED FIXTURING OF DIRECT PRINT MOLDS FOR CAST COMPONENTS

(71) Applicant: GE Infrastructure Technology LLC, Greenville, SC (US)

(72) Inventors: Ethan Conrad Schaeffer, Greenville, SC (US); Canan U. Hardwicke, Greenville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/468,148

(22) Filed: Sep. 15, 2023

(65) Prior Publication Data

US 2025/0091118 A1 Mar. 20, 2025

(51) Int. Cl.
*B22C 9/24* (2006.01)
*B22C 9/06* (2006.01)
*B33Y 50/00* (2015.01)
*B33Y 80/00* (2015.01)

(52) U.S. Cl.
CPC ............... *B22C 9/061* (2013.01); *B22C 9/24* (2013.01); *B33Y 50/00* (2014.12); *B33Y 80/00* (2014.12)

(58) Field of Classification Search
CPC .............. B22C 9/06; B22C 9/061; B22C 9/24
USPC ... 164/4.1, 6, 15, 23, 24, 47, 271, 361, 365, 164/369
See application file for complete search history.

(56) References Cited

U.S. PATENT DOCUMENTS

| | | | |
|---|---|---|---|
| 2013/0220570 A1* | 8/2013 | Sears et al. ............... | B22C 9/10 164/34 |
| 2014/0262107 A1* | 9/2014 | Hanrahan et al. ..... | B33Y 80/00 164/349 |
| 2015/0096713 A1* | 4/2015 | Marcin ............... | B22D 17/2209 164/520 |
| 2019/0001402 A1* | 1/2019 | Yang et al. ............ | B33Y 10/00 |
| 2019/0111472 A1 | 4/2019 | Hampshire et al. | |
| 2019/0118253 A1* | 4/2019 | Przeslawski et al. .. | C30B 11/14 |
| 2022/0362965 A1 | 11/2022 | Garay et al. | |
| 2023/0311199 A1* | 10/2023 | Barber et al. ............. | B22C 9/02 164/271 |

* cited by examiner

*Primary Examiner* — Kevin P Kerns
(74) *Attorney, Agent, or Firm* — Eversheds Sutherland (US) LLP

(57) ABSTRACT

A method of optimizing strength in an improved mold for a cast component. The method may include the steps of evaluating a flaw in an existing mold, adding external reinforcement features to a design of the improved mold, manufacturing the improved mold in an additive manufacturing process, and casting the cast component in the improved mold.

14 Claims, 4 Drawing Sheets

METHOD FOR INTEGRATED FIXTURING OF DIRECT PRINT MOLDS FOR CAST COMPONENTS

TECHNICAL FIELD

The present application and the resultant patent relate generally to cast components, such as cast parts, cast components, cast gas parts, and the like, and more particularly relate to improved methods and systems for integrated fixturing of strengthened direct print molds to create castings of components in a highly efficient and accurate manner.

BACKGROUND

A gas turbine engine conventionally includes a compressor for compressing ambient air and a number of combustors for mixing the flow of air with a flow of fuel to generate hot combustion gases. A turbine receives the flow of hot combustion gases and extracts energy therefrom for powering the compressor and for producing output power for an external load such as an electrical generator and the like. The hot gas path components of the gas turbine engine, such as turbine airfoils, traditionally were manufactured using an investment casting process. In such a process, molten metal alloy is introduced into a mold cavity defined between a shell and a core and allowed to solidify so as to form a completed casting. Depending on the application, the turbine components may be required to withstand thermal stresses due to high temperatures, centrifugal forces, and large temperature fluctuations. Accordingly, the turbine components may include internal cooling passages as well as other types of complex geometries.

Conventional mold techniques for manufacturing turbine components may be time-consuming and/or may limit the resolution of the mold and/or the core. Moreover, the shell formed after slurry dips may limit heat transfer. By contrast, additive manufacturing techniques and 3-D printing allows the first molds to be manufactured in a fast and efficient manner. Manufacturing highly complex shapes and/or the rigors of the multiple process steps between printing and casting, however, may cause stress features that result in cracking or deformation of the additively manufactured mold. Previous attempts to strengthen such molds have focused on developing mold compositions and firing processes to slow down burnout schedules. Similarly other attempts have used designs with internal recesses with different types of inserts. The use of such inserts, however, adds time and cost to the manufacturing process.

SUMMARY

The present application and the resultant patent provide a method of optimizing strength in an improved mold for a cast component. The method may include the steps of evaluating a flaw in an existing mold, adding external reinforcement features to a design of the improved mold, manufacturing the improved mold in an additive manufacturing process, and casting the cast component in the improved mold.

The present application and the resultant patent further may provide a mold for a cast component. The mold may include a component body of a ceramic material made from an additive manufacturing process and one or more external reinforcement features manufactured in the component body.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
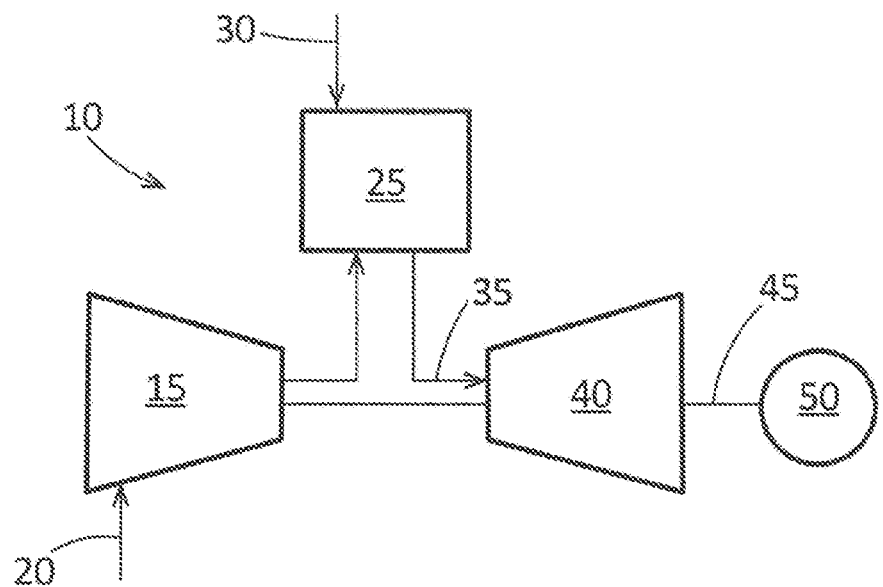
FIG. 1 is a schematic diagram of a gas turbine engine including a compressor, a combustor, a turbine, and an external load.

Referring now to the drawings, in which like numerals refer to like elements throughout the several views, FIG. 1 shows a schematic diagram of a gas turbine engine 10 as may be described herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. Alternatively, the combustor 25 may be an annular combustor. The flow of combustion gases 35 is in turn delivered to a turbine 40. The flow of combustion gases 35 drives the turbine 40 to produce mechanical work. The mechanical work produced in the turbine 40 drives the compressor 15 via a rotor shaft 45. The turbine 40 and the rotor shaft 45 also may drive an external load 50 such as an electrical generator and the like.

The gas turbine engine 10 may use natural gas, hydrogen gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may be part of a simple cycle or a combined cycle power generation system or other types of generation systems. The gas turbine engine 10 may have different configurations and may use other types of components. Other types of gas turbine engines also may be used herein. Multiple gas turbine engines, other types of turbines, and other types of power generation equipment also may be used herein together.

Figure 2:
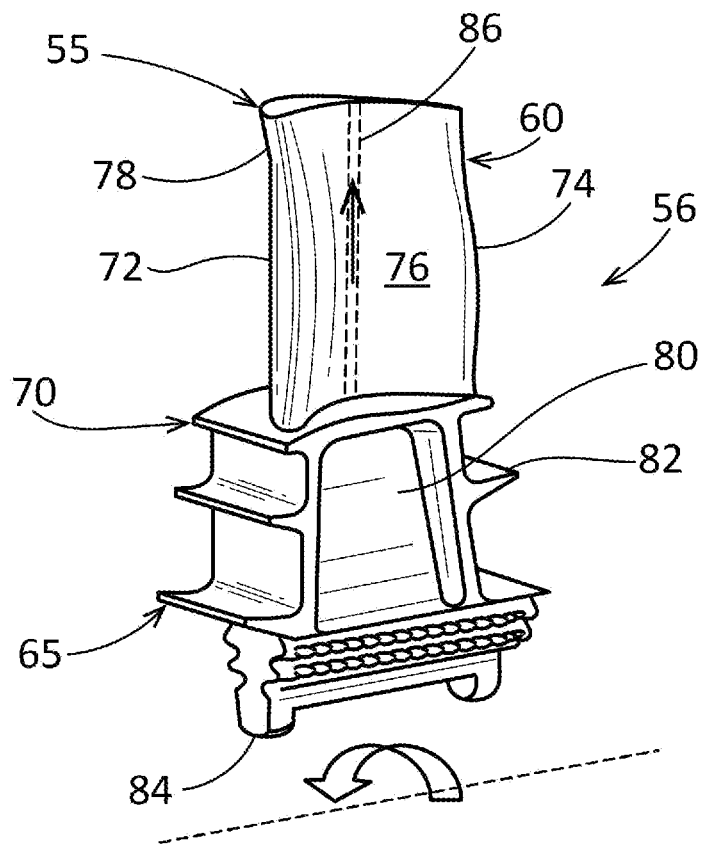
FIG. 2 is a perspective view of a turbine blade.

FIG. 2 shows an example of a turbine component 55 that may be used with the turbine 40. In this example, the turbine component 55 may be a turbine blade 56. Generally described, the turbine blade 56 includes an airfoil 60, a shank portion 65, and a platform 70 disposed between the airfoil 60 and the shank portion 65. The airfoil 60 generally extends radially outward from the platform 70 and includes a leading edge 72 and a trailing edge 74. The airfoil 60 also may include a concave wall defining a pressure side 76 and a convex wall defining a suction side 78. The platform 70 may be substantially horizontal and planar. The platform 70 may be exposed to the flow of the hot combustion gases 35. The shank portion 65 may include a shank cavity 80 therein. The shank portion 65 also may include one or more angel wings 82 and a root structure 84, such as a dovetail and the like. The root structure 84 may be configured to secure the turbine blade 56 to a rotor disk.

The turbine blade 56 may include one or more cooling circuits 86 extending therethrough for flowing a cooling medium, such as air from the compressor 15 or from another source. The cooling circuits 86 and the cooling medium may circulate at least through portions of the airfoil 60, the shank portion 65, and the platform 70 in any order, direction, or route to form a cooling medium flow path. Many different types of turbine components 55 may be used herein. The turbine blade 56 defined herein is for the purpose of example only. Other components and other configurations also may be used herein.

Figure 3:
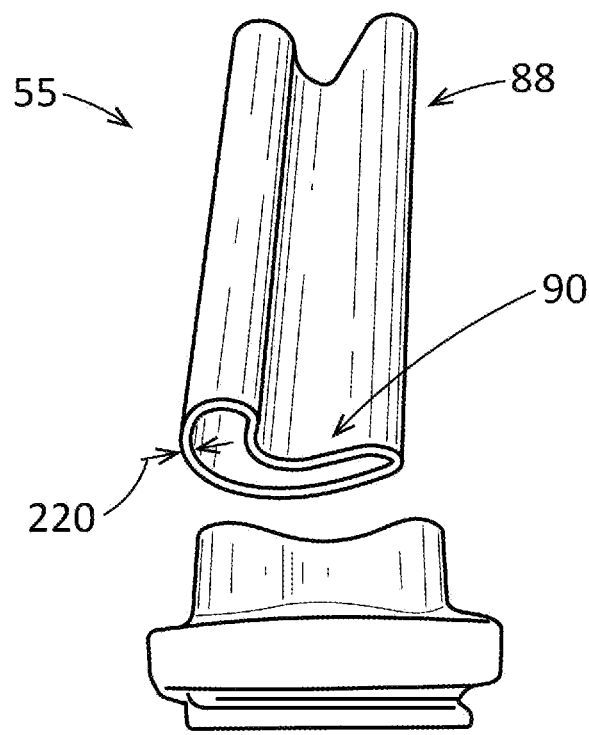
FIG. 3 is a perspective view of an example turbine component fired mold with a flaw.

Additive manufacturing techniques to create a turbine component casting mold generally include a number of process steps. These steps may include mold design via a CAD process, printing the mold via a ceramic slurry, preparing the mold via evacuation, cleaning, and firing the mold. These steps, however, may create stress concentrations and other faults in the mold. This is particularly true during the firing step that may place a significant amount of stress on the ceramic components and may lead to cracking and dimensional nonconformance. For example, FIG. 3 shows an existing airfoil fired mold 88 created by an additive manufacturing process. As is shown, the airfoil mold 88 has collapsed during the firing step. This collapse is considered a flaw 90 in the overall mold design. Another flaw 90 is a crack that forms in any wall of the mold 88.

Figure 4:
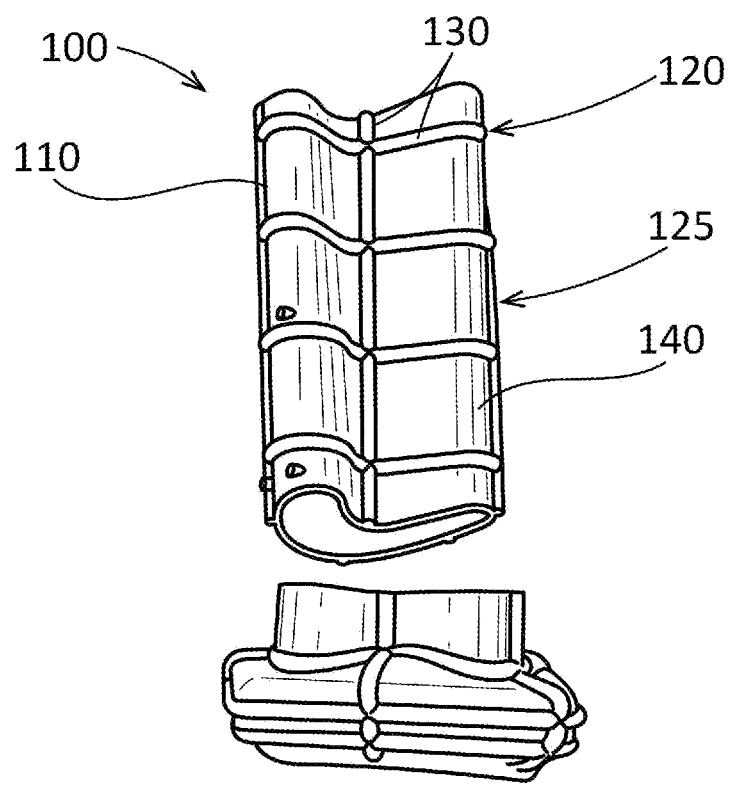
FIG. 4 is a perspective view of an example turbine component fired mold with external reinforcement features.

FIG. 4 shows a turbine component fired molded 100 made from a ceramic 110 from slurry in an additive manufacturing process. Additive manufacturing processes can take advantage of optimization of mold external features, for example, to improve mold strength, or to impart microstructural advancements in any location during the mold making process by adding external reinforcement features 120 to a component body 125. For example, the external reinforcement features 120 of the turbine component fired mold 100 may include external ribbing 130 to an airfoil portion 140 of the turbine component mold 100. The external ribbing 130 may extend in the vertical or horizontal directions or in any convenient direction. The external ribbing 130 may be placed on the surface in any shape/form calculated by structural methods and validated by experience. Likewise, the size and shape of the external ribbing 130 may vary upon application. The addition of the external ribbing 130 to the turbine component mold 100 allows the turbine component mold 100 to maintain the desired dimensional conformance during the firing step and the like. The external ribbing 130 and other types of external reinforcement features 120 help distribute stresses more evenly during 3D printing and post-print processes so as to improve the overall stiffness and strength of the turbine component mold 100. Traditionally, the external surface of a mold has been largely ignored, i.e., due to multiple shell dips and uniformly thick shells.

These external reinforcement features 120 may be designed into the CAD programing for mold printing by the methods and principles of, for example, topological optimization (TPO) used in various engineering disciplines and computational mechanics. TPO is a process used to optimize the distribution of material within a given design space (e.g., 3D casting mold) to achieve specific performance objectives (e.g., strengthening shell externals for handling ease, minimizing internal cracking in fired microstructure, and the like).

Specifically, topology optimization is a mathematical method that optimizes material layout within a given design space, for a given set of loads, boundary conditions and constraints with the goal of maximizing the performance of the system. Topology optimization is different from shape optimization and sizing optimization in the sense that the design may attain any shape within the design space, instead of dealing with predefined configurations. The conventional topology optimization formulation uses a finite element method (FEM) to evaluate the design performance. A number of different TPO systems are currently available.

Figure 5:
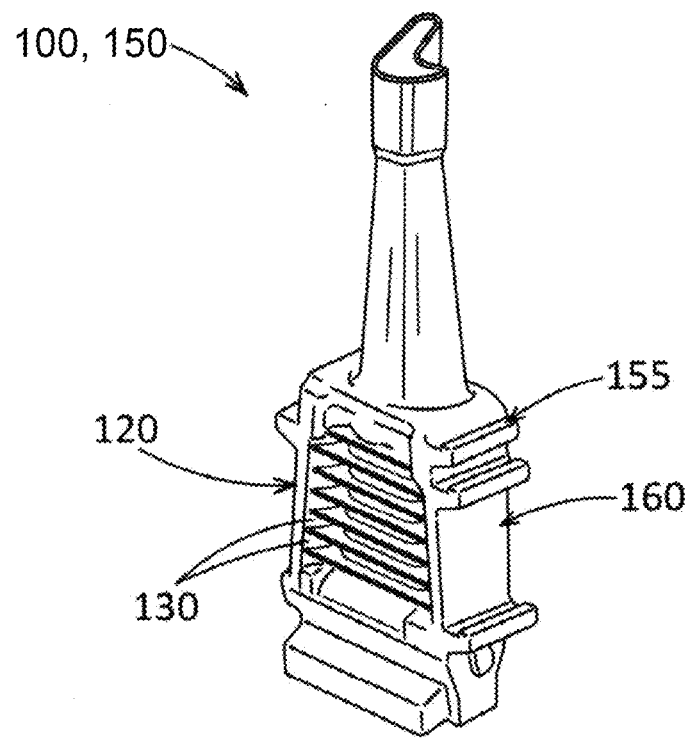
FIG. 5 is a perspective view of a turbine component mold with additional external reinforcement features.
Figure 6:
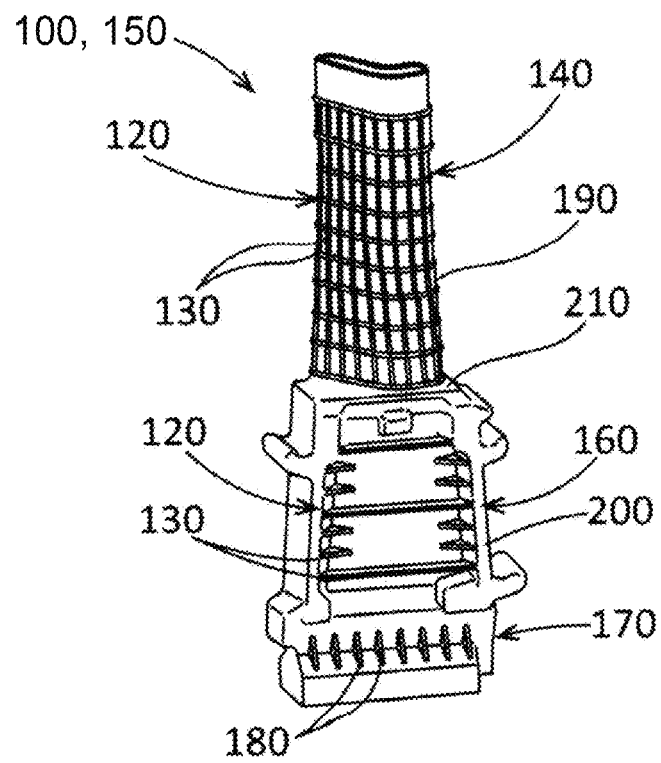
FIG. 6 is a perspective view of a turbine component mold with additional external reinforcement features.

FIGS. 5 and 6 show a further example of a turbine component fired mold 100. In these examples, a turbine blade mold 150. The turbine blade mold 150 may be a combined core and shell 155 and the like. In the example of FIG. 5, only a shank portion 160 of the turbine blade mold 100 has the external ribbing 130. In the example of FIG. 6, both the shank portion 160 and the airfoil portion 140 have the external ribbing 130. Further, the shank portion 160 and/or the base portion 170 (the pour cup region) also may include a number of gussets 180 formed therein. The use of the external ribbing 130 may greatly stiffen the airfoil portion 140 of the turbine blade mold 150 so as to tightly control deformation therein. Likewise, the use of the gussets 180 adds rigidity to the shank portion 160 and base portion 170 for optimal upright positioning of the turbine component mold 100 during firing and other process steps.

Other areas of topological optimization may include reinforced corners and edges 190. Such corners and edges 190 typically may be high-stress areas in the turbine component mold 100. Topological optimization may reinforce these regions by adding material so as to enhance resistance to deformation and cracking. Topological optimization also may smooth out stress concentration points in the overall geometry of the turbine component mold 100. By redistributing the ceramic slurry material 110, the turbine component mold 100 may become more resilient and less susceptible to failure in critical areas.

Similarly, the topological optimization process may identify load bearing areas 200 that bear the most stress (per casting geometry and melt characteristics) during the casting process. These load bearing areas 200 may be strengthened and optimized to withstand higher pressures and maintain shape integrity by creeping less during the casting process. Likewise, fillets 210 (i.e., rounded corners or edges) may be used to smoothen the transitions between different surfaces in the turbine component mold 100. Topological optimization may optimize the sizes and shapes of the fillets 210 to minimize stress concentrations and enhance overall mold strength.

Other concerns may include the overall material thickness 220. Topological optimization may help identify areas where material thickness 220 may be increased or reduced. These changes enable the turbine component mold 100 to be more efficient in material usage while maintaining or even improving overall structural integrity. Likewise, the optimization process may be used to tailor the external structure of the turbine component mold 100 to provide anisotropic properties, i.e., different mechanical properties along different directions. Such properties may be beneficial for applications where directional strength is crucial. The specific features and designs resulting from topological optimization will vary based on the intended application, load conditions, and manufacturing constraints. The optimization process takes these factors into account to arrive at the most suitable and efficient design for the external reinforcement features 120 and the turbine component mold 100.

The use of the external reinforcement features 120 on the turbine component mold 100 thus speeds and improves the overall casting process. The process steps of CAD design, printing, firing, casting, and finishing are all simplified and made more efficient. The combination of additive manufacturing and local optimization provides needed rigidity those areas of the areas of the turbine component mold 100 that may tend to crack or deform. Likewise, the external reinforcement features 120 allows the turbine component mold 100 to stand stably in any firing orientation. Moreover, the overall design of the turbine component mold 100 may be quickly changed to take into account specific applications and/or customizable designs.

Figure 7:
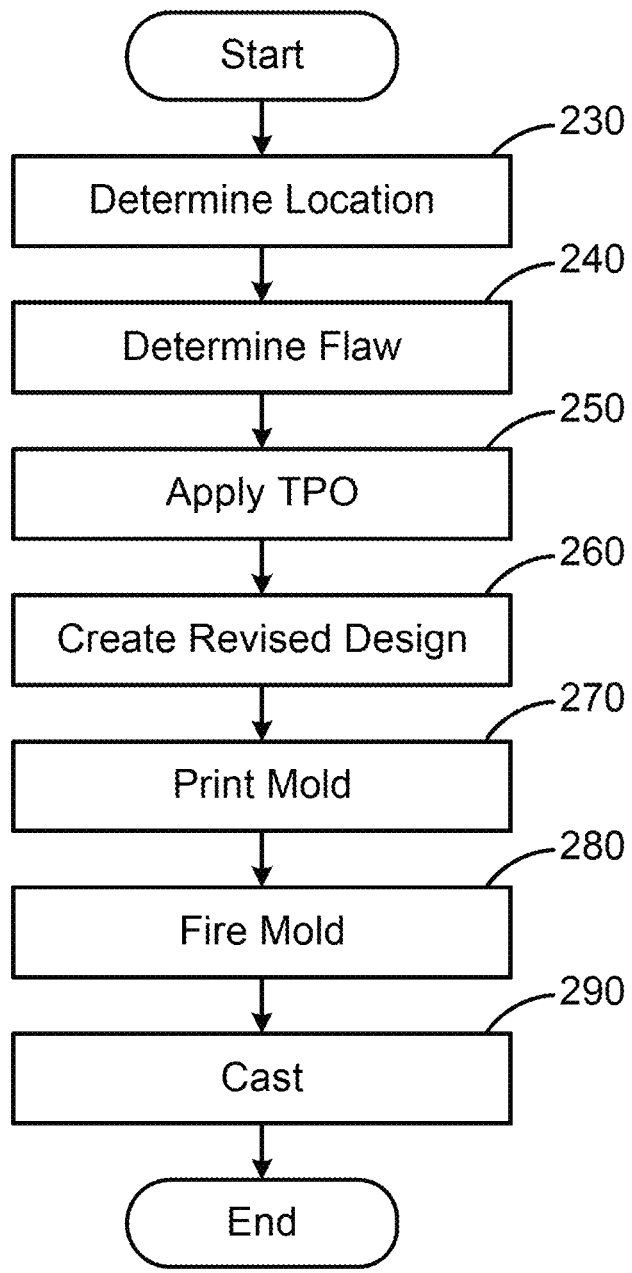
FIG. 7 is a flow chart of exemplary process steps in creating a turbine component mold with external reinforcement features.

FIG. 7 is a flowchart showing exemplary steps in a method of maximizing the design of the turbine component mold 100 to minimize productions flaws. In step 230, the portion in the turbine component mold 100 with a flaw 90 is determined. For example, cracking in the airfoil portion 140. In step 240, the nature of the flaw 90 is determined. For example, cracking. In step 250, topological optimization processes may be applied to create external reinforcement features 120 to resolve the flaw 90. For example, the external reinforcement features 120 may be the external ribbing 130 or other structures to reduce stress concentrations and accommodate load bearing areas as well as changes in material thickness. In step 260, the design of the revised or improved turbine component mold 100 may be created in a CAD process and the like. In step 270, the improved turbine component mold 100 may be created in an additive manufacturing process. In step 280, the turbine component mold 100 may be fired. In step 290, the turbine component mold 100 may be used for casting. Other and different processing steps may be used herein.

It should be apparent that the foregoing relates only to certain embodiments of the present application and resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. A method of optimizing strength in an improved mold for a cast component, comprising: evaluating a flaw in an existing mold; adding external reinforcement features to a design of the improved mold; manufacturing the improved mold in an additive manufacturing process; and casting the cast component in the improved mold.
2. The method of any preceding clause, wherein the step of adding external reinforcement features to a design of the improved mold comprises adding external ribbing to a section of the improved mold.
3. The method of any preceding clause, wherein the cast component is a turbine component, and the step of adding external reinforcement features to a design of the improved mold comprises adding external ribbing to at least one of an airfoil portion and a shank portion of the improved mold.
4. The method of any preceding clause, wherein the step of adding external reinforcement features to a design of the improved mold comprises adding gussets to a base portion and/or a shank portion of the improved mold.
5. The method of any preceding clause, wherein the cast component is a turbine component, and the step of adding external reinforcement features to a design of the improved mold comprises adding a fillet about an airfoil portion of the improved mold.
6. The method of any preceding clause, wherein the step of adding external reinforcement features to a design of the improved mold comprises adding external reinforcement features to a load bearing area of the improved mold.
7. The method of any preceding clause, wherein the step of adding external reinforcement features to a design of the improved mold comprises a topological optimization process.
8. The method of any preceding clause, wherein the topological optimization process reduces stress concentrations in the improved mold as compared to the existing mold.
9. The method of any preceding clause, wherein the step of manufacturing the improved mold in an additive manufacturing process comprises using a ceramic material.
10. The method of any preceding clause, wherein the topological optimization process comprises redistributing the ceramic material in the improved mold.
11. The method of c any preceding clause, wherein the topological optimization process comprises changing a thickness of the ceramic material in the improved mold.
12. The method of any preceding clause, further comprising firing the improved mold.
13. The method of any preceding clause, wherein the step of adding external reinforcement features to a design of the improved mold comprises a Computer Aided Design process.
14. The method of any preceding clause, wherein the improved mold comprises a combined core and shell.
15. A mold for a cast component, comprising: a component body; wherein the component body comprises a ceramic material made from an additive manufacturing process; and one or more external reinforcement features manufactured in the component body.
16. The mold for a cast component of any preceding clause, wherein the one or more external reinforcement features comprise external ribbing.
17. The mold for a cast component of any preceding clause, wherein the cast component is a turbine component, and the component body comprises at least one of an airfoil portion and a shank portion and the one or more external reinforcement features comprise external ribbing.
18. The mold for a cast component of any preceding clause, wherein the one or more external reinforcement features comprise gussets.
19. The mold for a cast component of any preceding clause, wherein the one or more external reinforcement features comprise fillets.
20. The mold for a cast component of any preceding clause, wherein the one or more external reinforcement features comprise external ribbing, gussets, and/or fillets.

We claim:

1. A method of optimizing strength in an improved mold for a cast component, comprising:
   evaluating a flaw in an existing mold;

adding external reinforcement features to a design of the improved mold;

manufacturing the improved mold together with the external reinforcement features in an additive manufacturing process; and casting the cast component in the improved mold.

2. The method of claim 1, wherein the step of adding external reinforcement features to a design of the improved mold comprises adding external ribbing to a section of the improved mold.

3. The method of claim 1, wherein the cast component is a turbine component, and the step of adding external reinforcement features to a design of the improved mold comprises adding external ribbing to at least one of an airfoil portion and a shank portion of the improved mold.

4. The method of claim 1, wherein the step of adding external reinforcement features to a design of the improved mold comprises adding gussets to a base portion and/or a shank portion of the improved mold.

5. The method of claim 1, wherein the cast component is a turbine component, and the step of adding external reinforcement features to a design of the improved mold comprises adding a fillet about an airfoil portion of the improved mold.

6. The method of claim 1, wherein the step of adding external reinforcement features to a design of the improved mold comprises adding external reinforcement features to a load bearing area of the improved mold.

7. The method of claim 1, wherein the step of adding external reinforcement features to a design of the improved mold comprises a topological optimization process.

8. The method of claim 7, wherein the topological optimization process reduces stress concentrations in the improved mold as compared to the existing mold.

9. The method of claim 7, wherein the step of manufacturing the improved mold in an additive manufacturing process comprises using a ceramic material.

10. The method of claim 9, wherein the topological optimization process comprises redistributing the ceramic material in the improved mold.

11. The method of claim 10, wherein the topological optimization process comprises changing a thickness of the ceramic material in the improved mold.

12. The method of claim 1, further comprising firing the improved mold.

13. The method of claim 1, wherein the step of adding external reinforcement features to a design of the improved mold comprises a Computer Aided Design process.

14. The method of claim 1, wherein the improved mold comprises a combined core and shell.

* * * * *